United States Patent [19]

Hamerslag et al.

[11] Patent Number: 4,854,659
[45] Date of Patent: Aug. 8, 1989

[54] OPTICAL DEVICES

[75] Inventors: James D. Hamerslag, West Chester, Pa.; Robert W. Musk, Ipswich, England

[73] Assignee: BT&D Technologies, Ltd., Ipswich, United Kingdom

[21] Appl. No.: 200,392

[22] Filed: May 31, 1988

[51] Int. Cl.⁴ .......................... G02B 6/36; G02B 6/10; G02B 6/42; G02B 6/26
[52] U.S. Cl. .............................. 350/96.15; 350/96.14; 350/96.20; 357/74; 357/80; 250/227
[58] Field of Search ............... 350/96.13, 96.14, 96.15, 350/96.17, 96.20; 357/17, 19, 74, 80; 250/227

[56] References Cited

U.S. PATENT DOCUMENTS

| | | | |
|---|---|---|---|
| 4,130,343 | 12/1978 | Miller et al. | 350/96.15 |
| 4,156,206 | 5/1979 | Comerford et al. | 350/96.15 X |
| 4,296,998 | 10/1981 | Dufft | 350/96.20 |
| 4,338,577 | 7/1982 | Sato et al. | 372/36 |
| 4,403,243 | 9/1986 | Hakamada | 357/74 |
| 4,615,031 | 9/1986 | Eales et al. | 372/36 |
| 4,623,220 | 11/1986 | Grabbe et al. | 350/96.20 |
| 4,730,330 | 3/1988 | Plihal et al. | 350/96.15 X |
| 4,741,585 | 5/1988 | Uken | 350/96.15 |
| 4,744,619 | 5/1988 | Cameron | 350/96.15 X |
| 4,752,109 | 6/1988 | Gordon et al. | 350/96.20 |
| 4,767,170 | 8/1988 | Mizutani et al. | 350/96.14 |
| 4,787,696 | 11/1988 | Norris et al. | 350/96.15 X |

FOREIGN PATENT DOCUMENTS

| | | |
|---|---|---|
| 21473 | 1/1981 | European Pat. Off. . |
| 0199565 | 10/1986 | European Pat. Off. . |
| 2581768 | 5/1985 | France . |
| 57-96582 | 6/1982 | Japan . |

Primary Examiner—William L. Sikes
Assistant Examiner—Akm E. Ullah

[57] ABSTRACT

An optical transmitter assembly (1) comprises an optical source (20) and an optical detector (20) arranged to receive light output from the source (10) indirectly via a reflector (30). The source (10), the detector (20), and the reflector (30) are mounted on a common support structure (40). A unitized light reflector assembly (70) having the reflector (30) and detector (20) on a ceramic plate (72) is also disclosed.

33 Claims, 6 Drawing Sheets

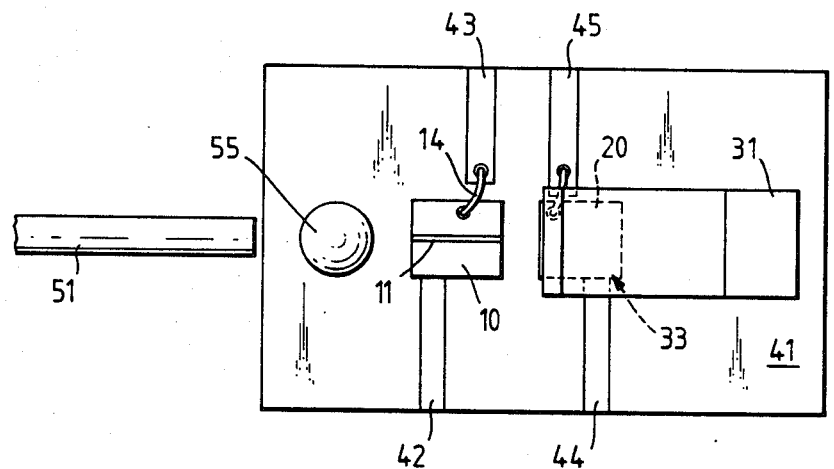
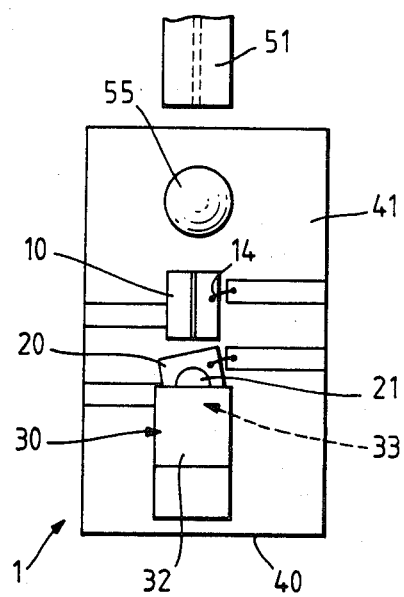
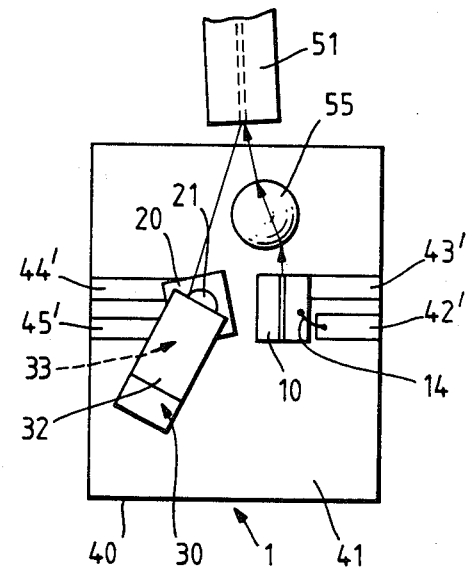

OPTICAL DEVICES

FIELD OF THE INVENTION

This invention relates to optical transmitters and in particular though not exclusively to optical transmitters for use in optical communications systems employing optical fibers as transmission medium.

BACKGROUND OF THE INVENTION

Semiconductor lasers used in conventional laser transmitters have an active region which is of the order of two micrometers in cross-section. In an optical transmission system using optical fibers as the transmission medium, the light emerging from the active region at one facet of the laser, the "front" facet, needs to be coupled into the core of an optical fiber. If the fiber is a single mode fiber, the core is only about five micrometers to ten micrometers in diameter.

For many present applications stabilizing the output power of a light source is sufficient even though the level at which the power output is stabilized differs arbitrarily from device to device. Simple bi-directional optical links, and optical disk read heads are examples of such applications. Alignment between the laser and a photo-detector monitoring the output of the light source is much less critical for these purposes, as a slow speed photo-detector has a typical diameter of two hundred fifty (250) micrometers.

An optical read/write head for optical recording and reproduction is described in published European Patent Application EP-A- No.0199565 (SONY Corp.). The optical read/write head comprises a laser diode transmitter, a photo-diode receiver, and a semi-silvered prism providing a semi-reflecting mirror. Light from the laser transmitter is partially reflected by the semi-reflecting mirror onto the optical recording medium. The modulated beam reflected by the medium is partially transmitted by the same semi-reflecting mirror to the photo-diode of the receiver. The light output of the laser is monitored either by sensing directly the light emerging from the back facet of the laser, or by monitoring a portion of the light output of the front facet of the laser, which is transmitted through the semi-reflecting mirror formed on the prism, and reflected again by a fully reflecting portion of that prism onto a monitoring photo-diode.

A similar arrangement using semi-reflecting mirrors is described in published French patent application FR-A No. 2581768 (Thomson-CSF), in connection with a bi-directional optical communications link. Japanese Appln. No. 57-96582 discloses the use of light reflector in connection with an inspection device for a semiconductor laser.

In each case the absolute output power of the laser is, within fairly broad limits of specified laser performance, of secondary importance, and may vary from device to device over a considerable range without adverse effects.

However, mainly in newer applications such as optical networks using a plurality of transmitters and/or receivers, for example, the power output of individual transmitters needs to fall within much tighter tolerance limits. Some of the problems encountered in trying to achieve better control over the absolute level of output power of an optical transmitter arise from tolerances in semiconductor device manufacture, of both the laser and the monitoring detector.

Various other difficulties related to the manufacture and assembly of laser transmitters, such as ensuring adequate heat dissipation from the active area of the laser and providing convenient bonding areas for electrical connections to the laser and to the photo-detector, for example, will be well known to the person skilled in the art.

Where only small numbers of transmitters are required, it is obviously possible to select a few suitably matched transmitters from among the total manufacturing output in order to fulfill special performance requirements. For large scale supply of such transmitters, this is clearly not a practical approach. The present invention aims to provide an optical transmitter assembly which enables the photo-detector electrical output to be more reliably precalibrated with respect to the optical output of the laser, and which thereby avoids or at least mitigates some of the aforementioned problems.

The optical power coupled into the fiber depends on the alignment and distance between the light source and the fiber. On occasion, the coupling between source and fiber may be deliberately kept below optimum in order to limit the maximum optical power transmitted through the fiber. The present invention further aims to provide a transmitter assembly in which the electrical output of the photodetector can be calibrated to the optical power coupled into the fiber rather than the optical output power of the light source.

SUMMARY OF THE INVENTION

According to the present invention, an optical transmitter assembly comprises an optical source and an optical detector arranged to receive light output from the source indirectly via light deflection means, wherein the light deflection means includes a deformable reflector member.

The light source will usually be a semiconductor device, typically a semiconductor laser, although in certain applications non-lasing devices such as light emitting diodes (LEDs), and in particular, edge-emitting LEDs (ELEDs) may be used instead.

The source, the detector, and the reflector member are mounted conveniently on a common support structure. The support structure may conveniently be a generally planar substrate, preferably of electrically insulating, thermally conductive material.

The laser or other light source is conveniently mounted with its light generating region, in the case of lasers or LEDs, their active region, away from its mounting surface on the support structure or substrate, in contrast to many earlier arrangements in which a laser had to be mounted with its active region nearest the mounting surface.

The photo-detector is conveniently mounted on a mounting surface of the support structure such that the face of the detector which affords entry of incident light to its active area is in a plane substantially parallel with that mounting surface.

The reflector member preferably comprises a strip of material mounted on the support structure and set at an angle to both the back facet of the laser and the entry face of the photo-detector such that light emerging from the back facet of the laser is reflected onto the entry face of the photo-detector.

The reflector member may comprise, for example, of an angled strip of non-tarnishing, highly reflective material. Instead, the reflector member may be provided with a suitable non-tarnishing reflector surface, e.g., by gold plating. The strip itself is mounted at one end on the common substrate, and a portion of the strip carrying the reflector extends upwardly, at an angle, to the common substrate.

The beam deflection means may include focusing or de-focusing means. Thus, for example, the reflector member may be shaped to form a focusing reflector.

Employing a reflector member which is deformable, or which has at least a portion which is deformable, allows the direction and amount of the light reflected onto the photo-detector to be adjusted. This adjustment can compensate for mounting tolerances as well as for performance tolerances among lasers and/or detectors. Improved matching of electrical detector output to optical source output or coupled optical power can thereby be achieved.

The common substrate conveniently comprises a monolithic block of electrically insulating, but thermally conductive material, the thermal conductivity being required for dissipation of the heat generated in the light source. Using an electrically insulating material permits appropriate conductor tracks to be formed on the substrate, by metal deposition for example.

The support structure may further provide surface areas for anchorage points for an associated optical fiber, control circuits, and the like.

The aforementioned components may be affixed directly to the primary support structure or to subsidiary support structures which are, in turn, affixed to or formed on the support structure common to them. Thus, in an alternate embodiment, the detector and the light reflector are mounted on a plate of ceramic material, which plate serves to define a subsidiary support structure. These elements (plate, detector, and reflector) cooperatively define a unitized reflector assembly which is positionable on the primary support structure (i.e., the substrate on which the source is mounted) at any predetermined position with respect to the optical source. In this embodiment of the invention, the source is mounted on a heat sink with the surface of the source having the active region thereon being located adjacent to the heat sink.

The unitized reflector assembly includes a ceramic plate having a first, upper, and a second, lower, surface thereon. The first surface of the plate is provided with distinct first, second, and third metallization regions thereon. The second surface of the plate is substantially totally covered with a metallization region. The light reflector is mounted on the first metallization region on the first surface of the plate, while the optical detector is mounted on the second metallization region thereof and in electrical contact therewith.

The ceramic plate is mounted with its second surface abutted against the primary support structure. In one modification, the primary support structure has a recess formed therein at a predetermined position thereon, with the recess having dimensions sized to receive the ceramic plate therein.

To calibrate the electrical output of the photodetector to the optical output of the source, one simply measures the light output of the source and the electrical output of the photodetector, and adjusts the orientation of the reflector until the photodetector output reaches the desired level. If the photodetector is to be calibrated to the optical power coupled into the fiber, one measures instead the optical power at a certain distance along the fiber.

DESCRIPTION OF THE DRAWINGS

The invention will be more fully understood from the following detailed description, taken in connection with the accompanying drawings, which form a part of this application and in which:

FIG. 3 is a top view of the assembly of FIG. 1;

FIG. 4 is a schematic top view of a modified transmitter assembly;

FIG. 5 is a schematic top view of a further modified transmitter assembly;

DETAILED DESCRIPTION OF THE INVENTION

Figure 1:
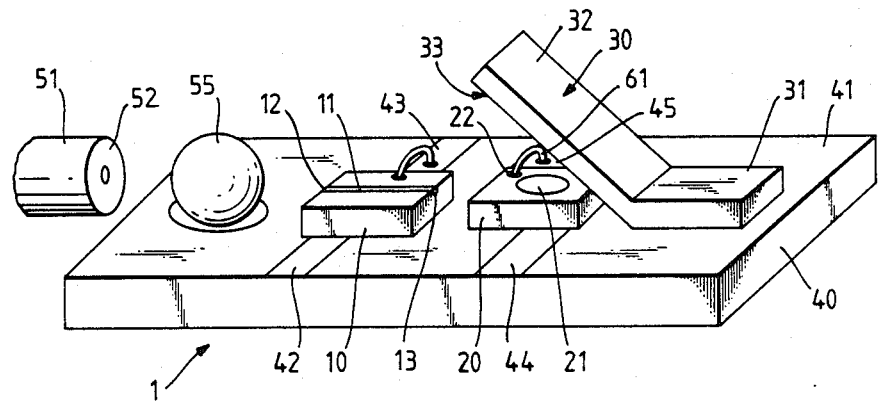
FIG. 1 is a schematic perspective view of an optical transmitter assembly.

Throughout the following detailed description, similar reference numerals refer to similar elements in all Figures of the drawings.

Figure 2:
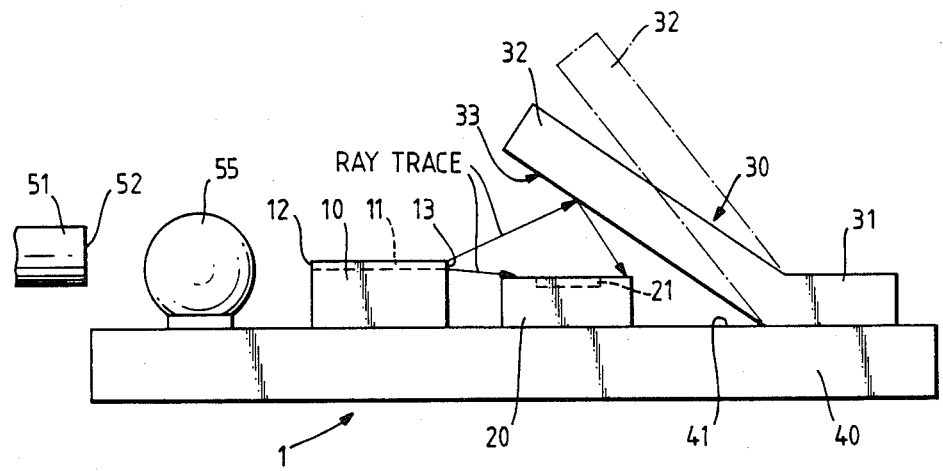
FIG. 2 is a side view of the assembly of FIG. 1.

Referring now also to the drawing FIGS. 1 to 3, an optical transmitter assembly 1 comprises a laser 10, a photo-detector 20 and a reflector member 30, all mounted on a common primary support structure in the form of a planar substrate 40.

The substrate 40 is of a material which is chosen to provide thermal dimensional stability, and good heat conduction and electrical insulation.

The laser 10 may be any one of a variety of suitable semiconductor laser devices whose construction and operation will be readily appreciated by those skilled in the art. The detailed structure of such semiconductor devices will not be discussed here, as it is largely immaterial to the performance and understanding of the present invention.

The approximate location of the active region of the laser device is indicated schematically by the narrow stripe 11, and the front and back end facets by reference numerals 12 and 13, respectively. The laser 10 may be affixed to the substrate 40 by metal solder or in some other suitable manner which allows heat conduction from the laser to the substrate and also provides electrical continuity to the conductor track 42 on top surface 41 of the substrate 40. Another conductor track 43 provides electrical connection to the laser 10 via a bond wire 14.

The optical output of the laser from front facet 12 is coupled via a lens 55 into an optical fiber 51 in the manner described below.

As can be seen from FIG. 2 in particular, the laser is mounted so that its active region 11 is remote from, and extends parallel to, the top surface 41 of the substrate 40.

The photo-detector 20 comprises a planar photodiode having its entry face 21 in a plane parallel to the top surface 41 of the substrate 40. Instead of being a device with a planar device structure, the photodiode may have a mesa structure, for example. The photodiode 20 is affixed to the substrate 40 in a similar manner to the laser 10, with electrical connection being made via the bottom surface of the body of the photodiode 20 via conductor track 44 and by a bond wire 61 from a conductor track 45 to a bonding area 22 on the top surface of the photodiode 20. The photodiode 20 serves to monitor the total optical output of the laser 10 by sensing the optical output from the back facet 13 of the laser 10. It is well known that the optical output from the back facet 13 is dependent on, but normally much lower than, the optical power output from the front facet 12 of the laser. The light emerging from the back facet 13 of the laser 10 is directed onto the active area 21 of the photodiode 20 via the reflector member 30.

The reflector member 30 comprises a strip of metal or metal alloy in the form of a lazy L. It is affixed by its leg 31 to the top surface 41 of the primary support substrate 40, again by soldering or in some other suitable manner. The upwardly extending arm 32 provides a reflecting surface area 33 above, and inclined to all of the substrate 40 and the axis of the active region of the laser 10 and the entry face 21 of the photodiode 20. Using a strip which is initially formed in proper L shape, i.e., with its leg 31 and arm 32 extending at a right angle to each other, has been found most convenient for practical assembling. The initially vertically extending arm 32 allows easy access to the photo-detector 20 for bonding purposes. Thereafter, the arm 32 can be bent forward into the configuration shown in FIGS. 1 and 2.

Referring now more particularly to FIG. 2 (in which some previously described elements have been omitted for clarity), it will be seen that light emerging from the back facet 13 of the laser is incident on the reflecting surface 33 and hence is reflected onto the entry face 21 of the photodiode 20.

The optical output from the back facet 13 of the laser 10 is incident, via the reflector 30, on the entry face 21 of the photodiode 20, where it is converted into a corresponding electrical output voltage appearing across tracks 43 and 44. Adjusting the inclination of the upwardly extending arm 32 of the strip 30 in turn changes the direction into which the light is reflected. An initial inclination of the arm 32 is indicated in FIG. 2 by dash lines. In this manner, the amount of light incident on the detector 20, and hence the electrical detector output, can be adjacent after completing assembly of the components 10, 20, and 30 on the substrate 40, to compensate for assembly tolerances and device tolerances of both the laser 10 and the photodiode 20. By this adjustment an electrical output signal of the photo-detector 20 can be provided which is in a predetermined relationship to the optical output signal of the laser 10. The material requirements for the strip are, firstly, that it must be sufficiently malleable to allow the necessary deformation during adjustment and, secondly, it must be sufficiently rigid to tolerate mechanical shocks thereafter without suffering deformation. A strip of annealed Ni of sufficient cross-sectional area would be suitable, for example. Dimensions of 0.2–1 mm width, and 0.1–0.25 mm thickness have been found suitable for a strip in which the leg 31 is 1–2 mm long, and the arm 32 is 1–3 mm.

In the assembly just described, the orientation of the side faces of the photodiode 20 is of little significance. Consequently, spurious reflection from these side faces back into the laser cavity can be largely eliminated by mounting the photodiode with its side faces mounted at an angle to the laser 10 as shown in FIG. 4. Also, the intensity of any spurious back reflection onto the back facet 12 of the laser and from the anti-reflection coated entry face 21 of the photodiode 20 via the reflector area 33 will normally be fairly insignificant.

An additional advantage of the embodiment of the transmitter assembly described herein stems from the possibility it provides of mounting of the laser diode 10 with its active region uppermost. This leads to several significant advantages. Firstly, it avoids spurious interference effects which can arise from the virtual diffraction slit formed between the active area and the surface 41 which the active region is immediately adjacent the surface 41. Secondly, mounting the laser which its active region lowermost requires exceedingly accurate alignment between the front facet of the laser and the corresponding edge of the substrate: if the substrate projects beyond the laser, interference effects (arising in the manner described above with respect to the back facet) will occur at the front facet; if the laser overhangs the substrate, then heat conduction away from the active area is adversely affected, leading to reduced device lifetime, or reliability, or both.

Moreover, if the laser is affixed by soldering to the substrate with its active region nearest the substrate, the formation of even a small solder bump may obstruct the light output of the laser and, again, cause interference effects. Using the approach of the present invention allows the laser 10 to be mounted with its active area uppermost, which not only largely avoids these problems, but also enables a considerable simplification in the very critical alignment between the laser and output fiber. Moreover, as shown in the drawings, the greatly increased spacing of the active region 11 from the surface 41 of the substrate 40 enables a lens 55 to be interposed between the laser and the fiber 51 to be mounted on the substrate. The lens 55 shown is a spherical lens which is secured to the substrate 40 by means of metal or glass solder, for example. The spacing of the lens from the front facet 11 of the laser is typically a few micrometers, depending upon the type of lens chosen (e.g., whether the lens is a spherical less, or a graded index lens, etc.).

Another modification of an optical transmitter assembly according to the present invention is shown in FIG. 5. Using a spherical lens, spurious reflection back into the laser 10 from the cleaved fiber end-face 52 can be minimized by providing a lateral and/or angular offset between fiber 51 and the laser 10, as shown in FIG. 5. Moreover, reflection on the cleaved end-face 52 of the fiber may be used in place of the strip 30 to reflect a proportion of the lens output power out the photodiode 20. The advantage of this arrangement as shown in FIG. 5 is firstly that the laser can be designed for nominally 100% reflection at its back facet 13, resulting in improved laser power output, and, secondly, the otherwise undesirable but inevitable reflection of light (approximately four percent (4%) for an air-glass interface) at the cleaved fiber end to 51 is advantageously put to use to provide the monitoring signal.

In an alternate embodiment of the invention, shown in FIGS. 6 to 9, the reflector 30 and the optical detector, or photodiode, 20 can themselves be included as part of a unitized light reflector assembly, generally indicated at reference character 70, that is received as a unit on the primary support structure, or substrate 40. This embodiment of the invention is believed best illustrated in connection with FIG. 6, which is a side elevational view, in section, generally similar to FIG. 2.

The unitized light reflector assembly 70 includes a ceramic plate 72 having an upper surface 74 and a lower surface 76. The plate 72 forms a subsidiary support structure which may be mounted to the primary support structure 40. The monitor photodiode 20 and the reflector 30 are supported on the upper surface 74 of the ceramic plate 72 in a manner to be discussed. The lower surface 76 of the plate 72 is disposed on the substrate 40. The substrate 40 itself may form part of an overall package for an optical transmitter. It should be understood that although the present application is written in terms of an optical transmitter, the reflector arrangement disclosed in this application may be used with any other optical device having an optical source therein, such as an optical amplifier.

A heat sink S on which the laser device 10 is mounted is situated on the substrate 40. In the embodiment shown in FIG. 6, the active region 11 of the laser 10 is disposed in next adjacency to the heat sink S. The active region 11 of the laser 10 lies a predetermined distance D above the surface 41 of the substrate 40, which is taken as the measurement datum. As will be developed, in the preferred instance, the upper surface 21 of the optical detector 20 lies a second, lesser, distance C above the same datum. It should be understood, however, that the surface 21 of the detector 20 may lie at the same distance above the substrate 40 as the active region 11 of the laser 10 or may lie a greater distance above the substrate 40 than the active region 11 of the laser 10. That is the distance C may be equal to or greater than the distance D so long as the reflector is arranged to reflect light onto the diode.

Figure 6:
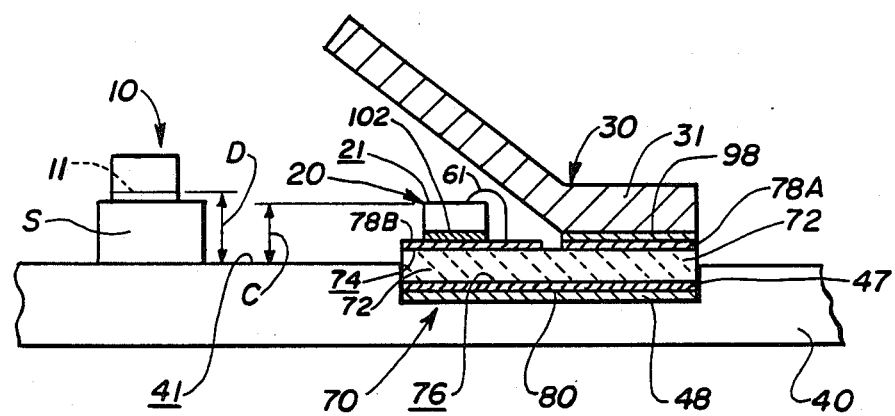
FIG. 6 is a side elevational view, in section, of an alternate embodiment of the present invention having a unitized light reflector assembly.

Also in the embodiment of FIG. 6 the substrate 40 is shown as having a recess 47 located at a predetermined position on the substrate 40. The recess 47 is provided therein for receipt of the assembly 70. The recess 47 assists in locating the assembly 70 on the substrate 40. In general, the dimensions of the recess 47 conform to the perimetric dimensions of the ceramic plate 72. The presence of the recess 47 assists in locating the monitor photodiode 20 at the distance C so that the surface 21 of the diode 20 lies below the active region 11 of the laser 10. It should be appreciated that the recess 47 could be eliminated, if desired, in which event the preferred, optimal location of the diode 20 with respect to the strip 11 (i.e., below the active region of the laser) can be achieved by using a thinner material for the plate 72.

Figure 7:
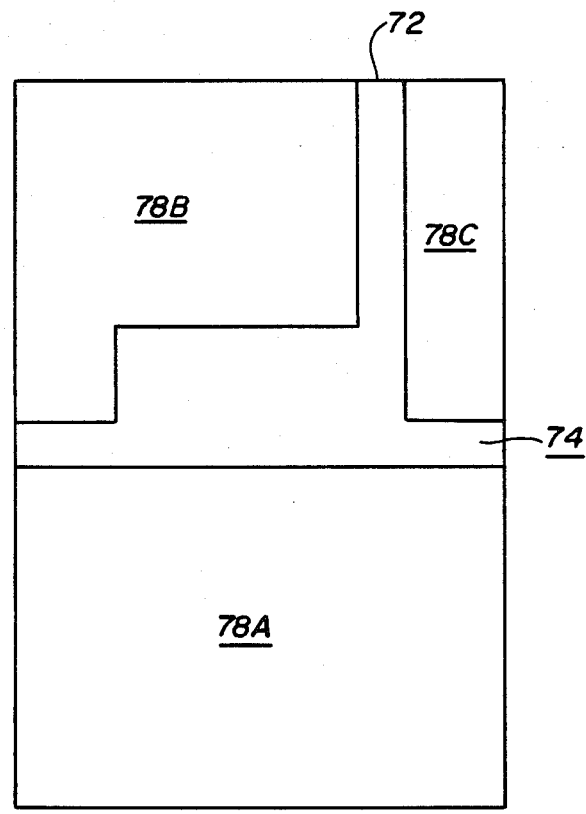
FIG. 7 is a plan view of the upper surface of a ceramic plate used in the embodiment of the invention shown in FIG. 6.

The ceramic plate 72 is a generally rectanguloid member formed in the preferred instance of a material such as ninety-six percent (96%) alumina. FIG. 7 is a plan view of the upper surface 74 of the ceramic plate 72. This surface 74 of the plate 72 is provided with metallized regions 78A, 78B, and 78C. The regions 78A, 78B, and 78C are preferably formed from a thick film gold metallization material such as that manufactured and sold by the Electronic Materials Division of the Electronics Department of E. I. du Pont de Nemours and Company, as composition 5715. Of course, any suitable alternative material may be used to form the metallization regions 78A, 78B, and 78C. The dimensions of the plate 72 are on the order of 0.050 inches wide and 0.075 inches long, which are typical dimensions for the application of the invention in the optical transmitter illustrated. The metallization regions 78A, 78B, and 78C are typically on the order of 0.0005 inches in thickness. In addition, the entire lower surface 76 of the plate 72 is covered with a layer 80 of metallization, preferably the same metallization as used for the regions 78. The metallized region 78A serves as the area against which the leg 31 of the reflector 30 is mounted. The region 78B defines the area on the surface 74 on which the photodiode 20 is received and thus corresponds in function to the conductor track 44 (FIG. 1). The region 78C defines the contact pad for the bond wire 61 and thus corresponds in function to the track 45 (FIG. 1).

Figure 8:
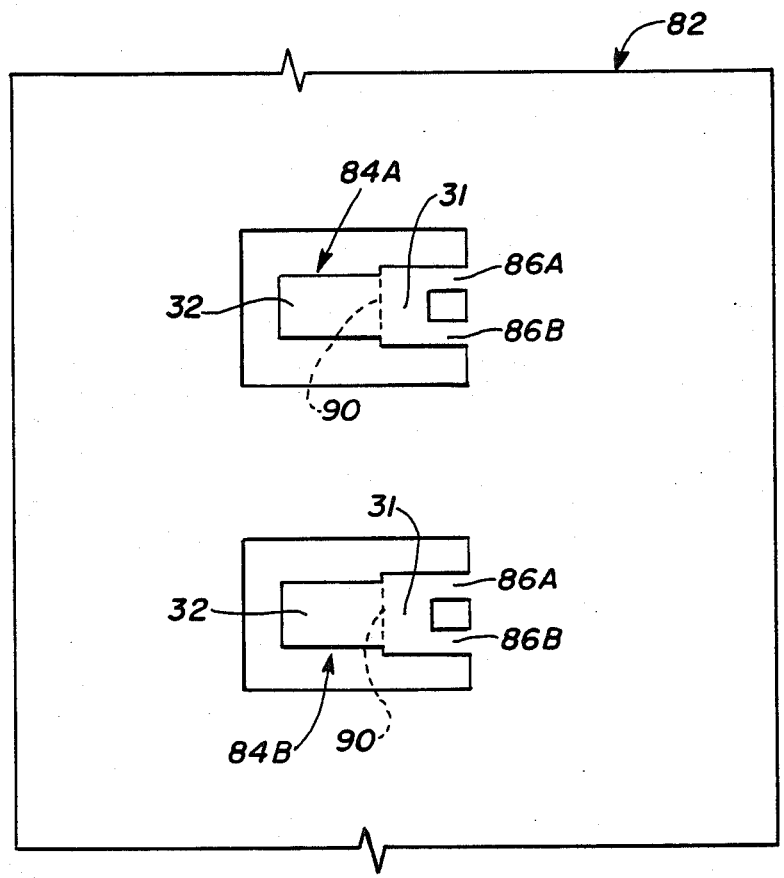
FIG. 8 is a plan view of a portion of a carrier strip, or lead frame, which carries a plurality of blanks used to form the embodiment of the present invention.

With reference to FIG. 8 shown is a plan view of a portion of a carrier strip or lead frame 82 having formed thereon a plurality of blanks 84 which are used to produce the reflector 30 used in the assembly 70. Two typical blanks 84A, 84B are shown. The lead frame 82 is preferably an elongated strip on the order of twelve inches in length, one-half inch (0.5) in width and 0.005 inches in thickness. The frame 82 is preferably formed from Kovar alloyed metal. The material of the frame 82 is plated with, for example, fifty to one hundred fifty (50 to 150) microinches of electrolytic nickel and thereafter with fifty to eighty (50 to 80) microinches of soft gold having a matte finish. The nickel and then gold plating is preferred to improve solderability and the reflectability of the reflector. The blanks 84 on the lead frame 82 are formed by a chemical machining or photoetching process. In some instances, stamping may be an economically attractive alternative manner to form the blanks.

Each blank 84 is held to the main portion of the lead frame 82 by tabs 86A, 86B. The tabs connect to a first section of the blank 84, which when finished corresponds to the leg 31 of the reflector 30. The blank 84 includes an integral second portion, slightly narrower than the first portion and connected to the same at a line of bending 90. The second portion of the blank 84 defines the arm 32 of the reflector 30. The narrowing of the blank 84 between the sections thereof is simply to more facilely define the line of bending 90. The blank 84 need only exhibit a width dimension sufficient to deflect a sufficient magnitude of energy to the monitor photodiode 20.

Figure 9A:
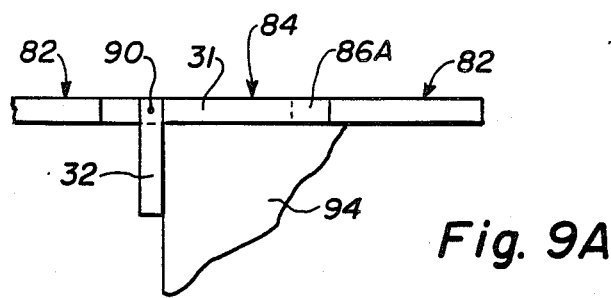
FIGS. 9A through 9C are a series of illustrations schematically showing the steps undertaken to form the light reflector assembly in accordance with the alternate embodiment of the present invention.
Figure 9B:
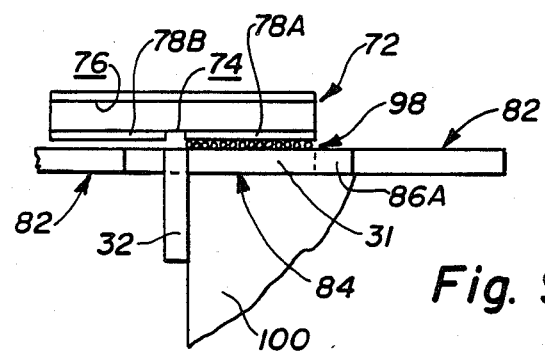
Figure 9C:
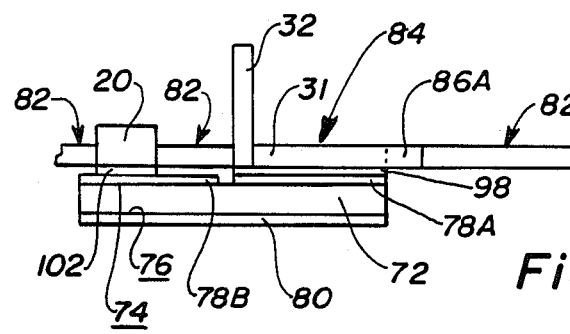

The sequence of operations to form the assembly may be understood with reference to FIGS. 9A through 9C. As a first step, seen in the side elevation of FIG. 9A, the second portion 32 of the blank 84 is bent over a form 94 at the line of bending 90 to clear that portion 32 of the blank 84 from the first portion 31 thereof so that further operations may occur. Typically, the second portion 32 is bent so as to define a predetermined angle, typically ninety degrees, with respect to the first portion 31 of the blank 84. The bending is performed using a tool that would not mar the finish on the second arm 32 of the reflector 30. For example, a plastic tool may be used. All of the blanks 84 in the lead frame 82 are bent in this manner.

As a next step, as shown in FIG. 9B, a layer of solder paste 98 is dispensed onto the leg 31 of the blank 84. A gold/germanium solder paste composition such as that manufactured and sold by the Electronics Department of E. I. du Pont de Nemours and Company, under the trademark FORMON, product number 8513 (88% gold, 12% germanium, melting temperature 356° C.) is preferred. It should be understood that other suitable solder pastes or a solder preform may be used if desired.

Next, using a suitable manipulator (not shown), the ceramic plate 72 is positioned on the lead frame 82 such that the first metallized region 78A on the upper surface 74 of the plate 72 lies on the layer 98 of the solder paste and abuts the first portion 31 of the blank 84. With the parts so arranged, a heater 100 is positioned against the blank 84. Sufficient heat is applied to the arm portion 31 of the blank 84 to cause the solder 98 to reflow. It has been found that the heat should be applied from the metal side, that is, from the side of the blank 84 opposite the ceramic plate 72, to avoid degradation of the metallizations 78A, 78B, and 78C or the metallization 80 on the ceramic plate 72. The ceramic plate 72 is thus affixed to the first portion 31 of the blank 84. If the solder paste is used, as is preferred, the part should be cleaned, using a flux residue remover, such as that manufactured and sold by the Electronics Department of E. I. du Pont de Nemours and Company, under the trademark FORMON, product number 8529.

After the ceramic plate 72 has been applied to the blanks 84 on the lead frame 82, the frame is inverted and a photodiode 20 is secured to the second metallized region 78B on each of the ceramic plates 72 using a solder layer 102. As seen in FIG. 9C, a solder preform is preferred for the layer 102 in this instance since an active element (the diode 20) is being attached to the plate 72 and the use of a preform would obviate the need for subsequent cleaning of the part. Suitable for use as the preform is that manufactured and sold by Indium Corporation of America, Utica, N.Y., as alloy number 182 (80% gold, 20% tin, melting point 280°C.). However, it should be understood that a corresponding solder paste may be used to attach the diode 20 to the plate 72. If a paste is used, the part would be cleaned using the same flux residue remover as discussed above. The diode 20 is attached to the plate 72 (and particularly to the metallized region 78B thereof) using a die bonder instrument. The die bonder may apply heat from the ceramic side of the assembly in this instance since the risk of degradation of the metallization is lessened owing to the temperature at which the solder 102 reflows.

After the diodes 20 have been attached to the plate 72, the bond wire for each photodiode 20 is connected between the diode 20 and the third metallized region 78C on the plate 72, using a wire bonder. If desired, stress testing ("burn-in") of the photodiode 20 to eliminate premature failures and electrical testing of the assembly 70 to verify its operability may be performed while the assembly 70 is still attached to the lead frame 82.

With the foregoing steps completed, the tabs 86A, 86B are severed, thus freeing the completed assembly 70 from the lead frame 82. The assembly 70 is then inserted using a die bonder or other suitable manipulator into the recess 47 on the substrate 40. A layer 48 (FIG. 6) of solder paste or a solder preform is provided in the recess 47 prior to the insertion of the assembly 70. Suitable for use as the solder layer 48 is that manufactured and sold by Indium Corporation of America, Utica, N.Y., as alloy number 104 (62.5% tin, 36.1% lead, 1.4% silver, melting point 179°C.). The solder 48 is heated causing it to reflow, thus securing the assembly 70 to the substrate 40. If the recess 47 is not provided in the substrate 40, the assembly 70 can be attached to the substrate 40 using a die bonder. If the solder paste is used, the part should be cleaned, using the flux residue remover discussed above.

As a final step, bond wires are attached from the regions 78B, 78C to their respective appropriate external connections using a wire bonder.

Those skilled in the art having the benefit of the teachings of the present invention as hereinabove set forth may effect numerous modifications thereto. These modifications are to be construed as lying within the scope of the present invention as defined by the appended claims.

I claim:

1. An optical transmitter assembly comprising a support structure (40), an optical source (10), and an optical detector (20), the optical detector (20) being arranged to receive light output from the source (10) indirectly via light deflections means (30–33,52), wherein the light deflection means includes a reflector member (30), and wherein the source (10), the detector (20), and the reflector member (30) are mounted on the same support structure (40), characterized in that the reflector member (30) is a deformable member.

2. An assembly as claimed in claim 1, wherein the reflector member (30) comprises a strip (31, 32) of deformable material.

3. An assembly as claimed in claim 1, wherein the support structure (40) comprises a generally planar substrate.

4. An assembly as claimed in claim 1, wherein the support structure (40) is of electrically insulating material.

5. An assembly as claimed in claim 1, wherein each or all of the source (10), the detector (20), and the reflector member (30) are affixed directly to the support structure (40).

6. An assembly as claimed in claim 1 wherein at least one of the source (10), the detector (20), or the reflector member (30) is mounted in a subsidiary support which is affixed to said support structure.

7. An assembly as claimed in claim 1 wherein the optical source (10) is a semiconductor device.

8. An assembly as claimed in claim 1, wherein the optical source (10) is a semiconductor laser device.

9. An assembly as claimed in claim 7, wherein the optical source (10) is mounted with its active region (11) away from the support structure (40).

10. An assembly as claimed in claim 1, wherein the photo-detector is mounted on a mounting surface (41) of the support structure (40) such that a face (21) of the photo-detector affording entry of incident light to its active area is substantially parallel with the mounting surface (41) of the support structure (40).

11. In an optical device having an optical source mounted on a substrate, the improvement comprising:
 a unitized light reflector assembly (70) mountable on the substrate (40) in a predetermined position with respect to the optical source (10), the unitized light reflector assembly (70) comprising:
 a plate (72) having a first surface (74) thereon, the first surface (74) having a first region (78A) and a second region (78B) thereon;
 a light reflector (30) mounted on the first region (78A) of the plate (72); and
 an optical detector (20) mounted on the second region (78B) of the plate (72).

12. The unitized light reflector assembly of claim 11 wherein the plate has a predetermined perimetric dimension associated therewith and wherein the substrate (40) has a recess (47) located therein, the recess (47) being sized to receive the plate (72) therein.

13. The unitized light reflector assembly of claim 12 wherein the optical source (10) has an active region (11) therein, the active region (11) of the optical source (10) lying a first predetermined distance (D) above the substrate (40), and wherein the optical detector (20) has an upper surface (21) thereon, the upper surface (21) of the optical detector (20) lying a second, lesser, predetermined distance (C) above the substrate (40) when the assembly (20) is mounted in the recess (47) in the substrate (40) such that the upper surface (41) of the optical detector (20) lies below the active region (11) of the optical source (10).

14. The unitized light deflector assembly of claim 11 wherein the optical source (10) has an active region (11) therein, the active region (11) of the optical source (10) lying a first predetermined distance (D) above the substrate (40), and Wherein the optical detector (20) has an upper surface (21) thereon, the upper surface (21) of the optical detector (20) lying a second, lesser, predetermined distance (C) above the substrate (40) when the assembly (70) is mounted thereon such that the upper surface (21) of the optical detector (20) lies below the active region (11) of the optical source (10).

15. In an optical device having an optical source (10) mounted on a substrate (40), the improvement comprising:

a unitized light reflector assembly (70) mountable on the substrate (40) in a predetermined position with respect to the optical source (10), the unitized light reflector assembly comprising:

a ceramic plate (72) having a first surface (74) thereon, the first surface (74) having a first metallization region (78A) and a second metallization region (78B) thereon;

a light reflector (30) mounted on the first metallization region (78A); and an optical detector (30) mounted on the second metallization region (78B) and in electrical contact therewith.

16. The unitized light reflector assembly of claim 15 wherein the ceramic plate (72) has a predetermined perimetric dimension associated therewith and wherein the substrate (40) has a recess (47) positioned therein, the recess (47) being sized to receive the ceramic plate (72) therein.

17. The unitized light reflector assembly of claim 15 wherein the optical source (10) has an active region (11) therein, the active region (11) of the optical source (10) lying a first predetermined distance (D) above the substrate (40), and wherein the optical detector (20) has an upper surface (21) thereon, the upper surface (21) of the optical detector (20) lying a second, lesser, predetermined distance (C) above the substrate (40) when the assembly (70) is mounted thereon such that the upper surface (41) of the optical detector (20) lies below the active region (11) of the optical source (10).

18. The unitized light reflector assembly of claim 16 wherein the optical source (10) has an active region (11) therein, the active region (11) of the optical source (10) lying a first predetermined distance (D) above the substrate (40), and wherein the optical detector (20) has an upper surface (21) thereon, the upper surface (21) of the optical detector (20) lying a second, lesser, predetermined distance (C) above the substrate (40) when the assembly (70) is mounted in the recess (47) in the substrate (40) such that the upper surface (21) of the optical detector (20) lies below the active region (11) of the optical source (10).

19. The unitized light reflector assembly of claim 15 further comprising:

a third metallization region (78C) on the first surface (74) of the ceramic plate (72); and an electrical connection (61) disposed between the optical detector (20) and the third metallization region (78C).

20. The unitized light reflector assembly of claim 16 further comprising:

a third metallization region (78C) on the first surface (74) of the ceramic plate (72); and an electrical connection (61) disposed between the optical detector (20) and the third metallization region (78C).

21. A method for manufacturing a unitized light reflector assembly comprising the steps of:

(a) bending a first portion (32) of a blank (84) carried on a carrier strip (82) to define a predetermined angle with respect to a second portion (31) of the blank (84);

(b) attaching a plate (72) at a first region (78A) on a first surface (74) of the plate (72) to the second portion (31) of the blank (84) such that, when attached, the first portion (32) of the blank (84) lies spaced from the first surface (74) of the plate (72); and (c) attaching an optical detector (20) at a second region (78B) on the first surface (74) of the plate (72).

22. The method of claim 21 further comprising the step of:

(d) testing the assembly to verify its operability.

23. The method of claim 22 further comprising the step of:

(e) severing the assembly from the carrier strip (82).

24. The method of claim 21 further comprising the step of:

(d) severing the assembly from the carrier strip (82).

25. The method of claim 23 further comprising the step of:

(f) mounting a second surface (76) of the plate (72) to a substrate (40) having an optical source (10) thereon.

26. The method of claim 24 further comprising the step of:

(e) mounting a second surface (76) of the plate (72) to a substrate (40) having an optical source (10) thereon.

27. The method of claim 21 further comprising the step of:

(d) connecting the optical detector (20) to a third region (78C) on the first surface (74) of the plate (72).

28. The method of claim 27 further comprising the step of:

(e) testing the assembly to verify its operability.

29. The method of claim 28 further comprising the step of:

(f) severing the assembly from the carrier strip (82).

30. The method of claim 29 further comprising the step of:

(g) mounting a second surface (76) of the plate (72) to a substrate (40) having an optical source (10) thereon.

31. The method of claim 27 further comprising the step of:

(e) severing the assembly from the carrier strip (82).

32. The method of claim 31 further comprising the step of:

(f) severing the assembly from the carrier strip (82).

33. The method of claim 21 wherein step (b) comprises the following steps:

(b1) disposing a solder material (98) on the second portion (31) of the blank (84);

(b2) positioning the first region (78A) of the first surface (74) of the plate (72) on the solder material (98); and (b3) reflowing the solder material (98) by applying heat thereto from a heat source (100), the heat source (100) being positioned proximal to the blank (84) and thereby spaced from the Plate (72).

* * * * *